H. & A. H. HAYSSEN.
NAIL FEEDING AND DRIVING DEVICE.
APPLICATION FILED FEB. 7, 1908.

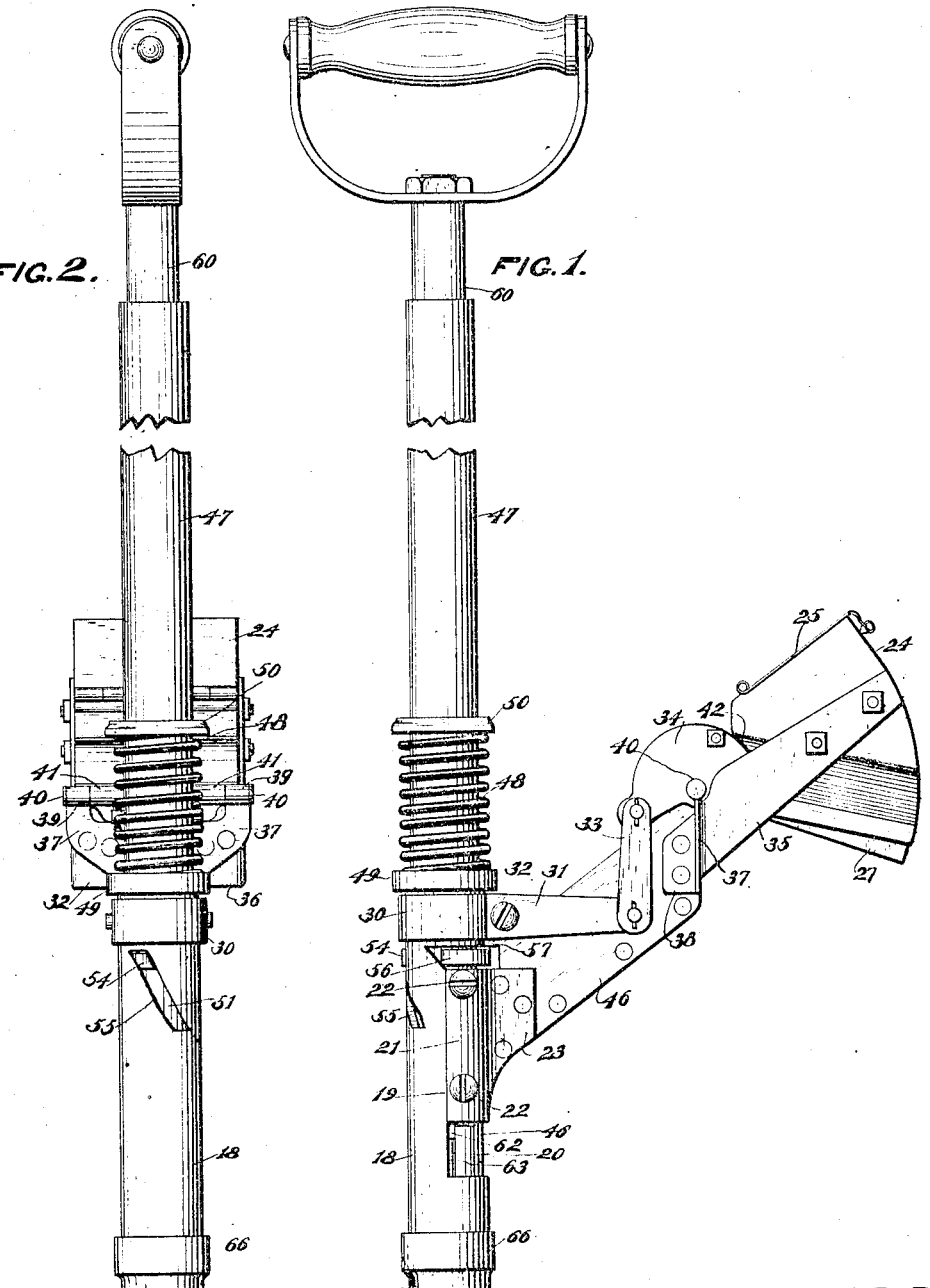

926,412.

Patented June 29, 1909.
4 SHEETS—SHEET 2.

WITNESSES.
INVENTORS.
Herman Hayssen
Arthur H. Hayssen
By Benedict, Morsell & Caldwell
ATTORNEYS H. & A. H. HAYSSEN.
NAIL FEEDING AND DRIVING DEVICE.
APPLICATION FILED FEB. 7, 1908.
926,412.
Patented June 29, 1909.
4 SHEETS—SHEET 3.
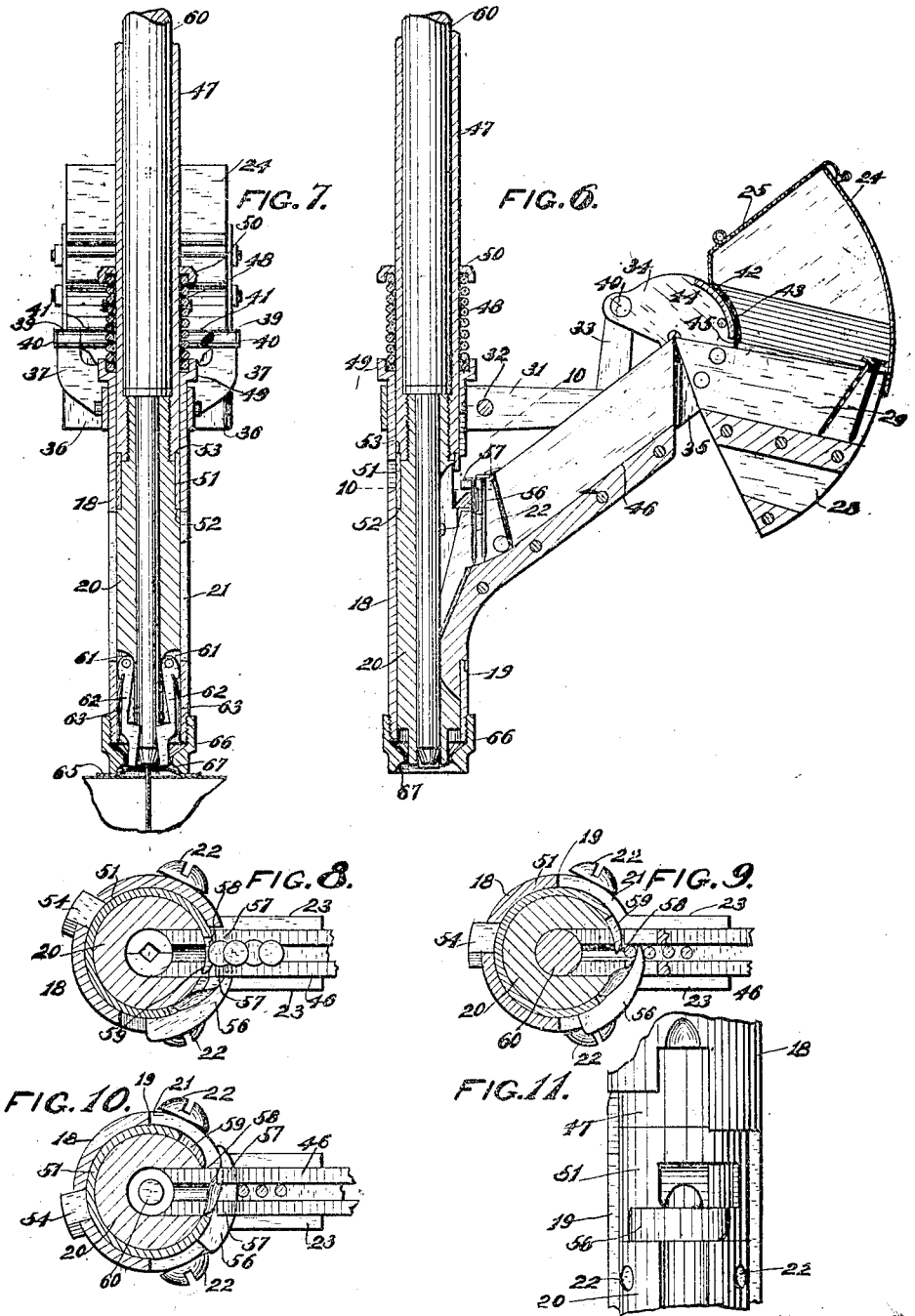

H. & A. H. HAYSSEN.
NAIL FEEDING AND DRIVING DEVICE.
APPLICATION FILED FEB. 7, 1908.

Patented June 29, 1909.

WITNESSES.

INVENTORS.
Herman Hayssen
Arthur H. Hayssen
By Benedict, Morsell & Caldwell
ATTORNEYS.

UNITED STATES PATENT OFFICE.

HERMAN HAYSSEN AND ARTHUR H. HAYSSEN, OF SHEBOYGAN, WISCONSIN.

NAIL FEEDING AND DRIVING DEVICE.

No. 926,412.     Specification of Letters Patent.     Patented June 29, 1909.

Application filed February 7, 1908. Serial No. 414,637.

*To all whom it may concern:*

Be it known that we, HERMAN HAYSSEN and ARTHUR H. HAYSSEN, residing in Sheboygan, in the county of Sheboygan and State of Wisconsin, have invented new and useful Improvements in Nail Feeding and Driving Devices, of which the following is a description, reference being had to the accompanying drawings, which are a part of this specification.

The invention relates to improvements in nail feeding and driving-devices.

The primary object of the invention is to provide an effective and simple mechanism for automatically and successively feeding nails down a runway and one at a time into the main body or barrel of the device, the nails assuming in the latter an upright position with the points downward ready to be driven, and held in such position by suitable holding mechanism until the hammer descends and drives the nail home, the said hammer on its descent and just before striking the head of the nail, acting to relax the holding mechanism.

With the above primary object, and other incidental objects in view, the invention consists of the devices and parts, or the equivalents thereof, as hereinafter more fully set forth.

Figure 4:
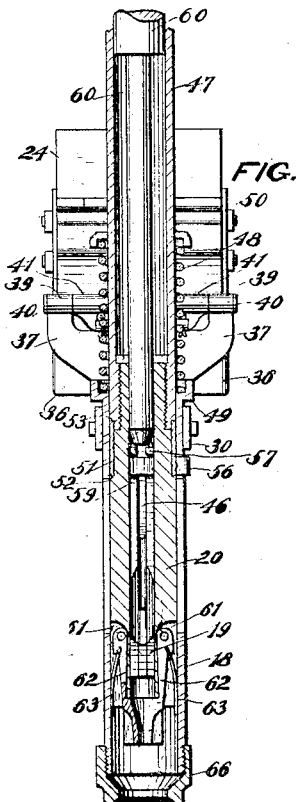
Figure 3:
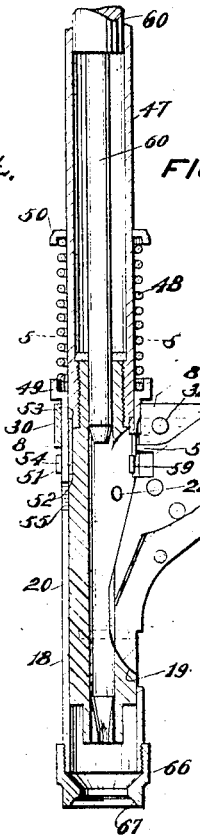
Figure 12:
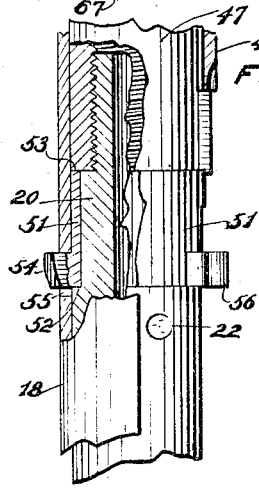
Figure 5:
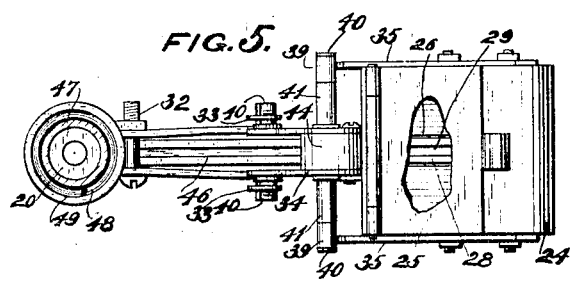
Figure 13:
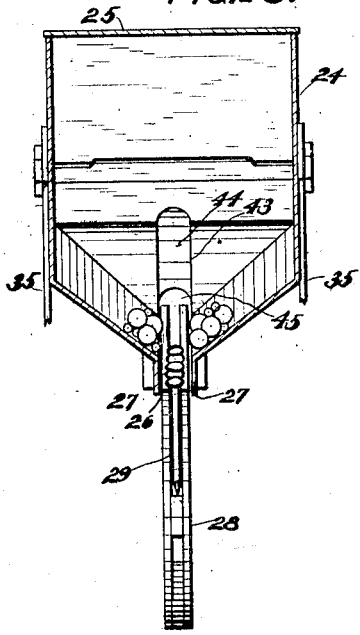
Figure 14:
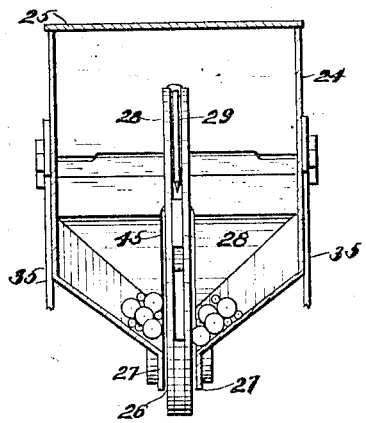
Figure 15:
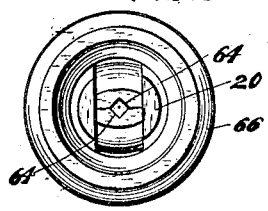
Figure 16:
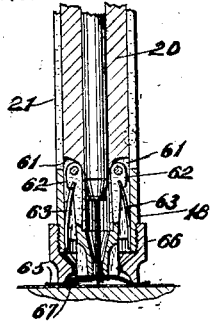
Figure 17:
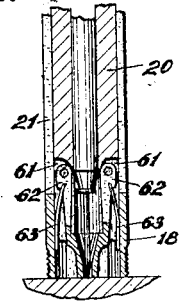

In the accompanying drawings, Figure 1 is a side elevation, part broken away; Fig. 2 is an elevation at right angles to Fig. 1, part broken away; Fig. 3 is a vertical sectional view of the lower portion of the device, showing the hammer raised; Fig. 4 is a vertical section taken at right angles to Fig. 3, also showing the hammer raised; Fig. 5 is a plan view part in horizontal section as indicated by the dotted line 5—5 of Fig. 3, and part broken away; Fig. 6 is a view similar to Fig. 3, with the hammer down, and the movable parts in the position which they assume when depressed; Fig. 7 is a view similar to Fig. 6, but at right angles thereto; Fig. 8 is a horizontal section on the line 8—8 of Fig. 2, showing the nail pushing finger out of engagement with a nail; Fig. 9 is a horizontal section taken on the same plane, but showing the nail pushing finger swung around into position to push a nail from the runway end into the barrel or bore of the inner tube section; Fig. 10 is a horizontal section on the line 10, 10 of Fig. 6; Fig. 11 is a rear view of a fragment of an intermediate portion of the device, with the nail pushing finger removed; Fig. 12 is a view of a fragment of a medial portion of the device, parts broken away to show interior construction; Fig. 13 is a vertical section of the nail hopper, looking at said hopper from the rear, and with the nail slide in its lowermost position; Fig. 14 is a similar view of the nail slide in its raised position; Fig. 15 is an enlarged inverted plan view of the lower end of the device; Fig. 16 is a detail vertical sectional view of the lower end of the device showing the hammer in engagement with a nail ready to drive the nail home; and Fig. 17 is a view similar to Fig. 16 but with the lower cap-holding collar removed.

Referring to the drawings, the numeral 18 indicates a lower outer tube section provided with a rectangular opening 19. Within the tube section 18 is an inner tube section 20. Fitted within the rectangular opening 19 of the tube 18, but of less length than said opening are plates 21. These plates are of curved form to conform to the curvature of the inner tube, and are secured to said inner tube by means of screws, or equivalents, 22. The inner edges of these plates do not meet, but are flanged outwardly, as indicated by the numerals 23, 23, said flanges being spaced a slight distance apart.

The numeral 24 indicates a nail hopper. This hopper is open at the top, the opening being controlled by means of a hinged lid 25. The bottom of the hopper is inclined downwardly toward the outer end thereof, and centrally of said inclined bottom is an elongated slot 26, the metal bordering the opposite edges of said slot being flanged downwardly, as indicated by the numerals 27, 27, in order to act as a guide for a nail slide 28. This nail slide is disposed within the hopper, and is adapted to swing upwardly and downwardly therein. The said slide is slotted from the upper edge downwardly, as indicated by the numeral 29, while the forward edge of said slide is in the arc of a circle to conform to the curvature of the front or outer side of the hopper against the inner face of which said curved edge of the slide fits. The corresponding curvatures of the two parts therefore enable the slide to swing freely up and down in the arc of a circle within the hopper.

Suitable mechanism should be provided to effect the swinging of the slide in the arc of a circle so as to cause the up and down movement referred to. The specific mechanism shown in the drawings for accomplishing this purpose will now be described. A split collar 30 surrounds the upper end of the lower tube section 18, and the ends of this collar at the split are continued outwardly to form two arms 31, 31. A screw 32 is turned through both arms, and has the effect of clamping the collar firmly to the tube 18. The outer ends of the arms 31 have pivotally connected thereto the lower ends of links 33, 33, and the upper ends of said links are pivotally connected to the opposite side plates of a tail or projection 34 extending from the nail slide 28 in a direction toward the main portion of the implement. The tail or projection 34 is made up of the two slide plates referred to, said plates spaced a slight distance apart and rigidly connected together. Arms 35, 35 are connected to opposite sides of the hopper and extend rearwardly beyond the rear side of said hopper, and are then bent inwardly toward each other, as indicated by the numerals 36, 36. The inner edges thereof, however, do not meet, so that a space is left therebetween. To the rear sides of the inwardly bent portions 36 of the arms 35 are riveted plates 37, 37, which are angular in form so as to provide members 38 which extend rearwardly therefrom. The upper edges of the plates 37 are provided with rounded sleeves 39, 39 in which are tightly fitted pins 40, 40. The two side plates of the tail or projection 34 have hubs 41, 41 extending therefrom. These hubs loosely surround the pins 40, so that said pins serve as pivots for the turning of the nail slide. The upper edges of the two plates of the tail or projection are curved in corresponding arcs of a circle. The rear side of the hopper is also correspondingly curved, as indicated by the numeral 42, in order to register with the said curvature of the tail or projection, and thereby permit the latter to freely turn on its pivots. This curved portion 42 of the hopper is provided with an elongated slot 43, which communicates at its lower end with the elongated slot 26 in the bottom of the hopper. (See Figs. 13 and 14 of the drawings.) A portion of the space between the upper edges of the plates which form the tail or projection 34 is bridged over or closed by a curved block 44. The forward end of this block terminates just in advance of the rear end of the upper slotted edge of the slot of the nail slide 38, so as to leave a small opening 45.

It will be understood, and as will be seen from the drawings, that the nail slide 28 is continued rearwardly for a short distance through the elongated slot 43, and between the two plates of the tail or projection 34, until it meets and registers with the slot of a nail runway 46, which runway is inclined downwardly from the hopper. The forward or upper end of this runway is riveted between the members 38 of the plates 37, and the rear or lower end of said runway passes between and is riveted to the outwardly extending flanges 23, 23 of the plates 21, which plates as before described are secured to the inner tube 20. The hopper mechanism is thereby made fast to said inner tube 20, and is caused to partake of the up and down movement of which said tube is capable. An upwardly extending tube 47 has a threaded connection at its lower end with the upper reduced threaded end of the inner tube section 20.

It will be evident from the construction thus far described that when the lower end of the outer tube section 18 is placed against a roof or other surface into which the nails are to be driven, and a down pressure exerted on the tube 47, the inner tube section 20 is thereby caused to move downwardly until the lower edges of the plates 21 contact with the lower bordering edge of the rectangular opening 19 of the lower outer tube section 18, when of course further movement of said tube is prevented. This down movement will necessarily cause a like movement of the nail hopper, by reason of the rigid connection between said hopper and the inner tube section 20 formed by the nail runway 46. As the hopper thus moves downwardly, an upward push is exerted on the links 33, 33, and consequently an upward force is exerted by said links against the tail or projection 34, and this necessarily causes the nail slide 28 to turn on the pivots 40 in a direction to swing downwardly the portion of the nail slide which is within the hopper. The limit of the downward movement of the inner tube 20 is such that the nail slide will be turned downwardly only to such an extent as to cause its upper slotted edge to register or be on a plane with the edges of the slot 26 in the bottom of the hopper, and in this position the nail slide is inclined downwardly toward the front side of the hopper. (See Fig. 6 of the drawings.) The return upward movement of the tube 47 and consequently the lower inner tube section 20 is facilitated by a coiled spring 48. The lower end of this spring is seated in a cup 49 formed at the upper end of the lower tube section 18, and the upper end of said spring is seated in a cupped collar 50 surrounding and rigidly secured to the tube 47. On the up movement of the parts referred to, the hopper is necessarily caused to move upwardly, and this upward movement is continued until the upper edges of the plates 21 contact with the upper bordering edge of the rectangular opening 19. During the up movement of the hopper a downward pull is exerted on the links 33, and hence the nail slide 28 is turned on its pivots in a direction to bring said slide on a downward incline toward the tube 18. In this position its slotted upper edge is brought to an inclined position toward the tube 18, and on a corresponding incline to the inclination of the runway, so that the slot of the nail slide is in direct alinement or registration with the slot of the runway, as most clearly shown in Fig. 3.

It is necessary to provide mechanism for preventing more than one nail at a time from being fed into the bore of the lower inner tube section 20, and also mechanism acting in conjunction therewith for forcing just one nail at a time into said bore of the tube 20.
The mechanism which we have provided for this purpose consists of a ring 51 fitting in a recess in the upper end of the inner tube section 20, and in a recess in the lower extremity of the upwardly extending tube 47. The respective recesses form shoulders 52 and 53 against which the upper and lower edges of the ring bear. (See Figs. 6 and 7.) The ring therefore moves downwardly and upwardly with the tubes 47 and 20, but in addition the said ring has a partial rotation in one direction when moved downwardly, and a partial rotation in the opposite direction when moved upwardly. This is secured by providing the ring with an outwardly projecting lug 54 which extends through an inclined slot 55 formed in the lower outer tube section 18. (See Fig. 1.) One end of the ring has formed integral therewith or secured rigidly thereto a circumferentially projecting outstanding nail pushing finger 56. The free end of this finger is adapted, in the partial rotation of the ring, to travel beneath projections 57 at the upper edge of the rear open end of the runway 46. The side of the ring which faces the rear end of the runway 46 is provided with an opening 58, and the bordering edge of this opening opposite the edge from which the nail pushing finger 56 extends is cut away so as to leave a lower laterally projecting inner guard finger 59, lying back of the nail pushing finger 56 and out of contact therewith. (See particularly Figs. 8 and 9.)

The numeral 60 indicates a vertically reciprocable hammer. The upper portion of this hammer is of such diameter as to fit snugly within the tube 47, and the lower portion of said hammer is reduced in diameter to fit snugly in the bore of the inner tube 20.
The lower extremity of this reduced portion of the hammer is beveled to form a reduced end of a diameter approximating the diameter of the head of a nail.

The lower end of the inner tube 20 is recessed at diametrically opposite points, as indicated by the numerals 61, 61, and in the upper end of these recesses are pivoted nail holding jaws 62, 62. These jaws are normally held inwardly toward each other by means of flat springs 63, 63. The jaws are thrown outwardly against the pressure exerted by the springs by the action of the hammer 60 in its descent, the lower end of said hammer passing between the jaws, and spreading them apart, as most clearly shown in Figs. 7, 16 and 17. The opposed faces at the lower ends of the jaws are provided with V-shaped recesses 64, 64. (See Fig. 15.) These recesses register when the jaws are pressed inwardly, and form an opening for the passage of the nail therethrough, so that the lower pointed end of the nail is held in the position to be driven into the wood. These V-shaped recesses extend upwardly only a short distance, and merge into semi-circular recesses, the arcs of which enlarge upwardly, so that when the lower inner faces of the jaws are together a rectangular opening is at the lower ends of said jaws and a circular opening, which gradually increases in diameter upwardly, is provided, which circular opening terminates at the internally shouldered portions of said lower contact faces of the jaws. It will be evident that the nail passing downwardly in the bore of the inner tube section 20 finally passes into the recesses of the jaws, entering first the upper enlarged circularly recessed portions of said jaws, and finally passing out of the lower squared opening thereof, with its point in position to be driven into the wood, the bearing of the jaws against the nail holding said nail in the upright position just referred to.

It will be frequently found advantageous to employ our improvement in nailing tar paper over roofs. In nailing down the paper, it is usual to drive the nails through tin caps similar to the caps 65 shown in Figs. 7 and 16 of the drawings. These caps have a raised central portion and an outer flat portion surrounding said raised central portion, and the nail is driven through the center of the raised portion. When it is desired to employ our device for driving the nails through these caps, it is desirable to equip the lower end of the lower outer tube section 18 with a means for centering so as to accurately guide the nail through the center of the raised portion of the cap. To accomplish this purpose, we thread the lower end of the tube section 18 and turn on to said threaded end a cap holding and centering collar 66, which projects downwardly below the lower end of the tube section 18. The extremity of this collar is reduced in diameter so as to bring its lower edge of a proper circumference to bear on the flat portion of the cap. When adjusted to the cap, it will be evident that the center of the bore of the inner tube section 20 will be in line with the center of the raised portion of the cap, and consequently the driving of the nail through said center of the raised portion of the cap is insured. The interior of the collar from its lower end upwardly, for a short distance, is concaved or rounded outwardly slightly, as indicated by the numeral 67, so as to accommodate the raised central portion of the cap.

When our device is employed in nailing generally under conditions where the caps 65 are not employed, a collar (not shown) is used with a hole large enough to accommodate the jaws 62 as they descend.

The steps of the operation of the mechanism are as follows: The hopper is filled with the nails which are to be fed to the runway and finally driven into the wood. It will be assumed that previous to the initial operation of the device the nail slide 28 is in its raised position within the hopper. The lower end of the outer tube 18 is then brought into contact with the roof or other surface into which the nails are to be driven. A down movement is now exerted on the upwardly extending tube 47. This has the effect of turning downwardly the nail slide from the position shown in Fig. 14, to the position shown in Fig. 13, in which latter figure the slotted upper edge 29 of the slide is in registration with the slot 26 in the bottom of the hopper. It will be seen from the drawings that the bottom of the hopper not only inclines downwardly toward the outer side of the hopper but said bottom may be said to consist of two half sections which also incline downwardly toward and to the central slot 26 of the hopper. Therefore when the nail slide is swung to its lowered position the nails within the hopper freely slide down the inclined bottom of said hopper, and into the slot 29 of the slide, with the heads of the nails uppermost and resting on the upper bordering edges of the slot 29, as clearly shown in Fig. 13. The tube 47 is now raised, and this brings the nail slide into registration with the nail runway, as hereinbefore fully described. This causes the nails to slide down the nail slide and into the slot of the runway. The raising of tube 47 also throws the nail forcing finger 56 out of operation, or in other words to the position shown in Fig. 8 of the drawings, while the inner guard finger 59 is turned to a position to intercept the nails, or to bridge over the opening 58 which leads to the bore of the inner tube 20, all as clearly shown in Fig. 8. The hammer is now raised, and following this the tube 47 again forced downwardly. This latter down movement of said tube has the effect of throwing the inner guard fingers 59 from the position shown in Fig. 8 to the position shown in Fig. 9, while the nail pushing finger 56 is also turned from the position shown in Fig. 8 to the position shown in Fig. 9, its free pointed end passing between two of the nails, so that when the ring 51 completes its partial rotation in this direction the advance nail which is engaged by the finger 56 is forced into the bore of the tube 20, as clearly illustrated in Fig. 10. The hammer is now brought down with force, and first acts to spread the jaws 62, 62 apart, and then contacts with the head of the nail, and drives the nail home. In all subsequent operations, that is, so long as there are nails in the hopper, it is only necessary to raise the implement from the roof or other surface, and this raising has the effect of bringing the nail slide 28 back to its rearwardly inclined position in registration with the nail runway 46, and will furthermore have the effect of causing the inner guard finger 59 to assume the position shown in Fig. 8, that is the position in which it acts to prevent a nail passing into the bore of the tube 20. Following this, the lower end of the lower tube section 18 is placed against the roof or other surface, the hammer is raised, and the tube 47 again brought down, which has the effect of throwing the inner guard finger 59 from its Fig. 8 position to its Figs. 9 and 10 position, and the nail pushing finger 56 from its Fig. 8 position to its Figs. 9 and 10 position, which of course has the effect of feeding a nail into the bore of the tube 20. The final step now is of course to bring down the hammer forcibly.

What we claim as our invention is:

1. In nail feeding and driving mechanism, the combination of nail driving mechanism having a lower stationary incasing portion and an interior tubular vertically reciprocable portion, a hopper provided with a slotted bottom and a slotted rear side, the two slots being in communication with each other, a runway inclined downwardly from the hopper to the nail driving mechanism and rigidly secured at its upper end to the hopper and at its lower end to the vertically reciprocable inner tube section, the said runway having a slotted upper edge which extends to and communicates with a slot in the rear upright edge of said runway, a nail slide within the hopper and having a slotted upper edge, and also provided with a tail or projection connecting, through the slot in the rear wall of the hopper, with the main portion of the slide, said tail or projection mounted on a pivot arranged back of the hopper, and connecting mechanism between the lower incasing portion and the tail or projection, said connection being so constructed that when the inner tube section is forced downwardly the portion of the nail slide within the hopper is turned downwardly in the arc of a circle to cause its slotted upper edge to be brought into registration with the slot in the bottom of the hopper, and when said inner tube section is raised, the nail slide is turned upwardly in the arc of a circle so as to cause its slotted upper edge to be brought at a downward incline and in alinement with the slot of the runway.

2. In a nail feeding machine, the combination of a hopper provided with a slotted bottom and a slotted rear wall, the two slots being in communication with each other, a nail slide within the hopper and provided with a slotted upper edge, and also provided with a tail or projection extending through the slot in the rear wall of the hopper, said tail or projection composed of two side plates secured to the main portion of the slide and spaced a slight distance apart and rigidly connected together, and between which plates the slotted rear end of the main portion of the slide extends, a pivot for the tail or projection, a runway rigidly secured to the hopper and inclining downwardly from the rear end of the space between the two plates forming the tail or projection, said runway having a slotted upper edge which communicates with a slot at the rear upright edge of the runway, a block bridging over a portion of the space between the two plates forming the tail or projection, the forward end of said block terminating short of the rear end of the upper slotted edge of the main portion of the slide, and means for turning the nail slide on its pivot, said slide when turned downwardly in the arc of a circle adapted to have its slotted upper edge brought into registration with the slot in the bottom of the hopper, and when turned upwardly on its pivot to have its slotted upper edge brought to a downward slant and in alinement with the slotted upper edge of the runway.

3. In a nail feeding and driving mechanism, the combination of a lower stationary incasing portion, an inner tubular vertically reciprocable portion open at its lower end, and having a nail inlet opening above its lower end, a hopper provided with a slotted bottom and a slotted rear side, the two slots being in communication with each other, a runway inclined downwardly from the hopper toward and to the nail inlet opening of the inner tubular portion and rigidly secured at its upper end to the hopper and at its lower end to said inner tube section, the said runway provided with a slotted upper edge, the slot thereof communicating with a slot at the inner or lower upright edge of the runway, a nail slide within the hopper provided with a slotted upper edge, said slide provided with a tail or projection connecting, through the slot in the rear wall of the hopper, with the main portion of the slide, a pivot for the tail or projection arranged back of the hopper, arms rigidly connected to and extending from the lower outer incasing portion of the driving mechanism, and links pivotally connected at their lower ends to the outer ends of the arms, and at their upper ends to the tail or projection, said arms and links thereby acting to swing downwardly the portion of the slide which is within the hopper, so as to cause the slotted upper edge of said portion of the slide to be brought into registration with the slotted bottom of the hopper, when the inner tube section is depressed, and to swing upwardly said portion of the slide within the hopper in the arc of a circle, and thereby cause its slotted upper edge to be brought into alinement with the slotted upper edge of the runway, when said inner tube section is raised.

4. In nail driving mechanism, the combination of an outer incasing portion, a vertically reciprocable inner tube section, having an open lower end, and a nail inlet opening above the lower end, a split ring carried by the inner tube section and movable up and down therewith, one end of said ring at the split provided with a circumferentially extending nail pushing finger, and the opposite end of said ring at the split provided with an inner guard finger adapted to open and cover the nail inlet opening of the inner tube section, means for causing the ring to partially rotate in one direction simultaneously with its movement downwardly with the inner tube section, and for causing said ring to partially rotate in the opposite direction simultaneously with its movement upwardly with the inner tube section, a hammer adapted to be moved up and down within the inner tube section, and a runway leading to the nail feeding opening of the inner tube section, the nail pushing finger adapted when the ring is rotated in one direction, to be brought between two of the nails in the runway, and push the advance nail through the inlet opening of the inner tube section.

5. In nail driving mechanism, the combination of an outer incasing portion provided with an inclined slot, a vertically reciprocable inner tube section, provided with a lower open end and with a nail inlet opening above its lower end which opening leads to the bore of the tube, and with which opening also the outer incasing portion is in communication, a split ring carried by the inner tube section and movable up and down therewith, said ring provided with an outwardly extending lug which enters the inclined slot of the outer incasing portion, and one end of said ring at the split provided with a circumferentially extending inlet pushing finger, and at the opposite end of said split provided with an inner guard finger, the latter adapted to open and close the nail inlet opening of the inner tube section, a hammer adapted to be moved up and down within the inner tube section, and a runway leading to the nail inlet opening of the inner tube section, the nail pushing finger, when the ring is moved in one direction, adapted to extend between two of the nails within the runway, and to push the advance nail through the inlet opening of the inner tube section and into the bore of said inner tube section.

6. In nail driving mechanism, the combination of an outer incasing portion, an inner tube section reciprocable in the outer incasing portion, the lower end of said tube being open, and said tube provided above its open lower end with a nail inlet opening leading to its bore, and with which opening the outer incasing portion is in communication, spring pressed jaws pivoted in slots at the lower end of the inner tube section, and adapted normally to be pressed inwardly by the spring in order to hold a nail in an upright position ready to be driven home, a hammer movable up and down in the bore of the inner tube, and adapted on its down movement to spread the jaws apart and drive the nail home, and a centering collar secured to the lower end of the outer incasing portion, and projecting below said lower end, the extremity of the bore of said collar being outwardly rounded to accommodate the raised portion of a metallic cap, and the outer edge of said collar adapted to bear against the flat portion of the metallic cap.

7. In nail feeding and driving mechanism, the combination of a lower stationary incasing portion for the nail driving mechanism, a vertically reciprocable inner tube section open at its lower end and provided above its lower end with a nail inlet opening with which the slot of the runway communicates, a split ring carried by the inner tube section and movable up and down therewith, one end of said ring at the split provided with a circumferentially extending nail pushing finger, and the opposite end of said ring provided at the split with an inner guard finger, means for causing the ring to partially rotate in one direction simultaneously with its movement downwardly with the inner tube section, and for causing the said ring to partially rotate in the opposite direction simultaneously with its movement upwardly, and a hammer adapted to move up and down in the inner tube and to drive home a nail fed through the nail inlet opening and into the bore of said inner tube.

In testimony whereof, we affix our signatures, in presence of two witnesses.

HERMAN HAYSSEN.
ARTHUR H. HAYSSEN.

Witnesses:
R. S. C. CALDWELL,
ANNA F. SCHMIDTBAUER.